June 2, 1964   M. N. LUTTRELL, JR   3,135,364
POST ANCHOR
Filed Oct. 10, 1960
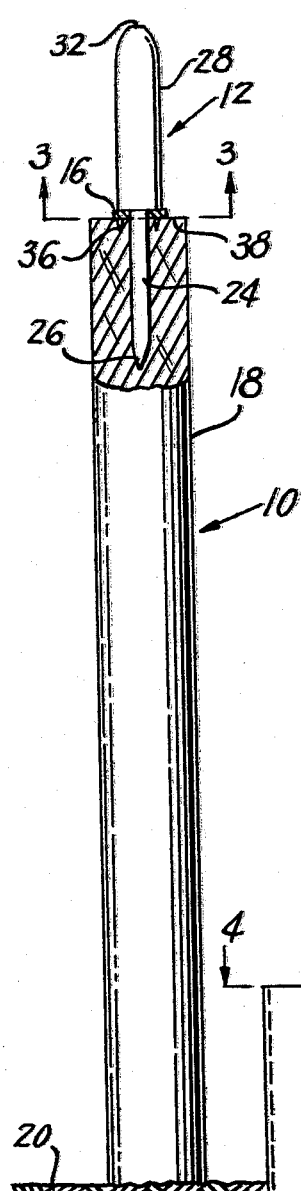
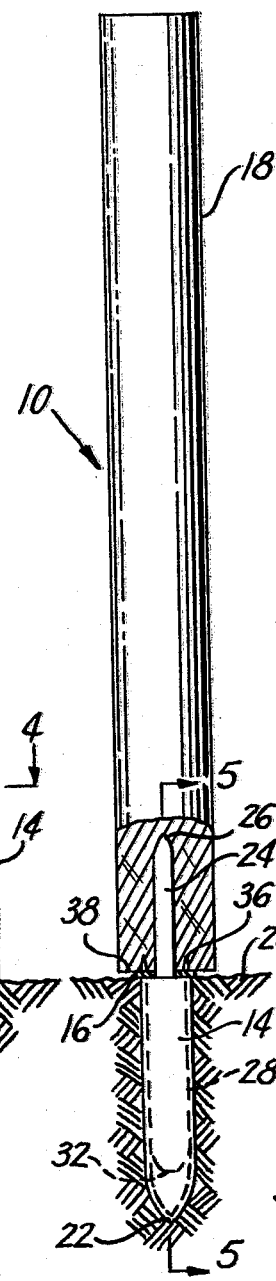
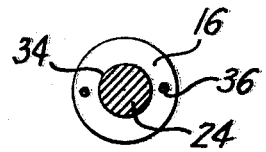
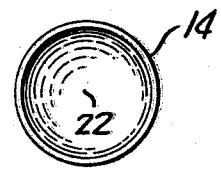
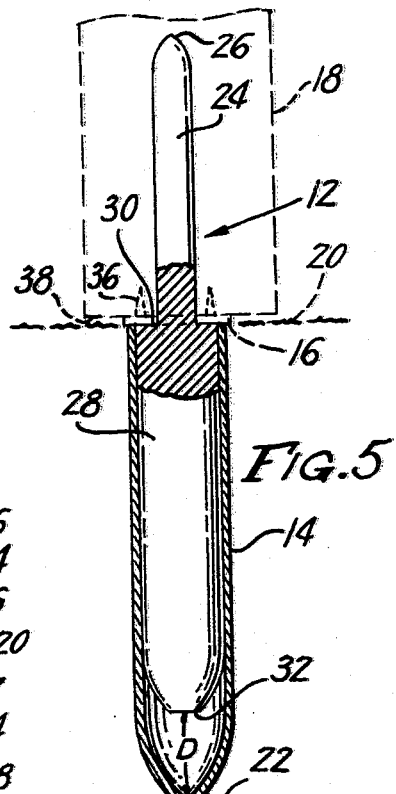
INVENTOR.
MILTON N. LUTTRELL, Jr.
BY
Gustave Miller
ATTORNEY

United States Patent Office 3,135,364
Patented June 2, 1964

---

3,135,364
POST ANCHOR
Milton N. Luttrell, Jr., 439 Texas St. SE.,
Albuquerque, N. Mex.
Filed Oct. 10, 1960, Ser. No. 61,687
1 Claim. (Cl. 189—29)

This invention relates to a post anchor, and has for an object to provide an anchor for removably securing a post, such as used on lawn and farm fences, to the ground, preferably out of contact therewith to provide a means of securing a post to the ground in one third or less of the normal time for digging a post hole to insert a post therein.

A further object of this invention is to provide a post anchor whereby a post may be more quickly secured to the ground; which is readily removable and which eliminates the necessity of digging post holes, and which supports a post out of contact with the ground, thus reducing the liability of the post to rot from contact with the ground.

With the above and related objects in view, this invention consists in the details of construction and combination of parts, as will be more fully understood from the following description, when read in conjunction with the accompanying drawing, in which:

FIG. 1 is an elevational view partly broken away, showing the invention in operation, with the post spike already hammered into the bottom of a post, and the spike sleeve partly hammered into the ground.

FIG. 2 is an elevational view of the invention when the operation is completed, with the post supported on the top of the ground and with the spike extending into the anchoring sleeve.

FIG. 3 is a sectional view on line 3—3 of FIG. 1.
FIG. 4 is a sectional view on line 4—4 of FIG. 1.
FIG. 5 is a sectional view on line 5—5 of FIG. 2.

There is shown at 10 the post anchor of this invention consisting of a double end two diametered spike 12, a hollow anchor sleeve 14 and a post butt end reinforcement and spike centering guide apertured disc 16, together with a post 18 to be anchored in the ground 20.

The hollow sleeve 14 is preferably of metal, although other suitable materials such as high impact plastics may be used. This sleeve 14 is preferably approximately two and seven-eighths inches external circumference and one-sixteenth inch in annular thickness, and terminates in a tapered, conical point so that it may be readily driven into the ground for approximately its entire length. When used with a small post such as a lawn front or back post, the length will preferably be approximately ten inches; with a large post such as a farm post, the length will be approximately fifteen inches. The double spike 12 consists of a small diameter spike 24, preferably approximately one with circumference tapering to a sharp point at 26, and of a larger diameter spike 28 preferably approximately two and three-quarters inches in circumference integrally extending from the other end of the small spike, providing a shoulder 30 at their junction, and terminating in an anvil head end 32 one-quarter inch in diameter.

For a small post, small spike 24 is preferably approximately six inches long and large spike 28 is eight inches long, while for a large post, small spike 24 is preferably approximately nine inches long and large spike 28 is twelve inches long.

Thus, for the small post and small anchor, there is a two inch differential at D within the sleeve, and in the large anchor, a three inch differential at D. The apertured disc 16, providing a small spike guide and post butt end reinforcement has a diameter at least as great, and preferably slightly greater than that of the hollow sleeve 14 at its open end and has an aperture 34 one inch in circumference, so that small spike 24 may just pass therethrough. Nail points 36, integrally extending from disc 34 provide a means for quickly securing the disc 16 to the butt end 38 of the post 18.

In operation, the disc 16 is hammered onto the butt end 38 of post 18, with the post 18 upside down on the ground 20, as in FIG. 1, and then, using the aperture 34 in disc 16 as a centering guide, the small spike 24 is driven into the butt end 38 of post 18 by a heavy hammer against anvil head end 32 until spike shoulder 30 abuts it, and the sleeve 14 is driven into the ground 20 at the desired location point 22 facilitating its entrance. The post 18 is then up-ended, and large spike 28 is readily and removably placed in the sleeve 14 in ground 22, thus removably anchoring post 18 on the ground, out of contact therewith, eliminating the tendency of the wood post 18 to rot from ground contact, the disc also reinforcing the butt end from splitting as the small spike 24 is driven therein.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A post anchor for removably securing a post to the ground but out of contact therewith, said post anchor comprising a hollow rigid sleeve open at one end and closed at its other end, said closed end being tapered, and a unitary double spike consisting of a small diameter solid spike and a large diameter spike integrally joined together and providing a shoulder at their juncture, said large diameter spike having its diameter and shape substantially equal to the internal diameter and internal shape of said hollow sleeve, said small diameter spike terminating in a tapered sharp point to be driven into a post and supported against said shoulder, an apertured disc having an aperture therethrough of a diameter at least equal to said small post diameter, said disc diameter being at least equal to said hollow sleeve external diameter at its open end, and post securing means integrally extending from said disc, whereby said disc may be secured to the butt end of a post to reinforce the same and serve as a guide when driving said small diameter spike into the post butt end, and post and spike may then be removably supported on said hollow sleeve which has been previously driven into the ground to thus anchor the post in position.

References Cited in the file of this patent

UNITED STATES PATENTS

| | | |
|---|---|---|
| 364,042 | Richardson | May 31, 1887 |
| 415,825 | Taylor | Nov. 26, 1889 |
| 423,633 | Saxon et al. | Mar. 18, 1890 |
| 449,777 | Hall | Apr. 7, 1891 |
| 930,607 | Morrill | Aug. 10, 1909 |
| 1,202,667 | Bearse | Oct. 24, 1916 |
| 2,358,089 | Le Gere | Sept. 12, 1944 |

FOREIGN PATENTS

| | | |
|---|---|---|
| 272,179 | Switzerland | Mar. 1, 1951 |